May 11, 1926.
D. P. CORCORAN
VALVE
Filed August 14, 1924
1,583,960
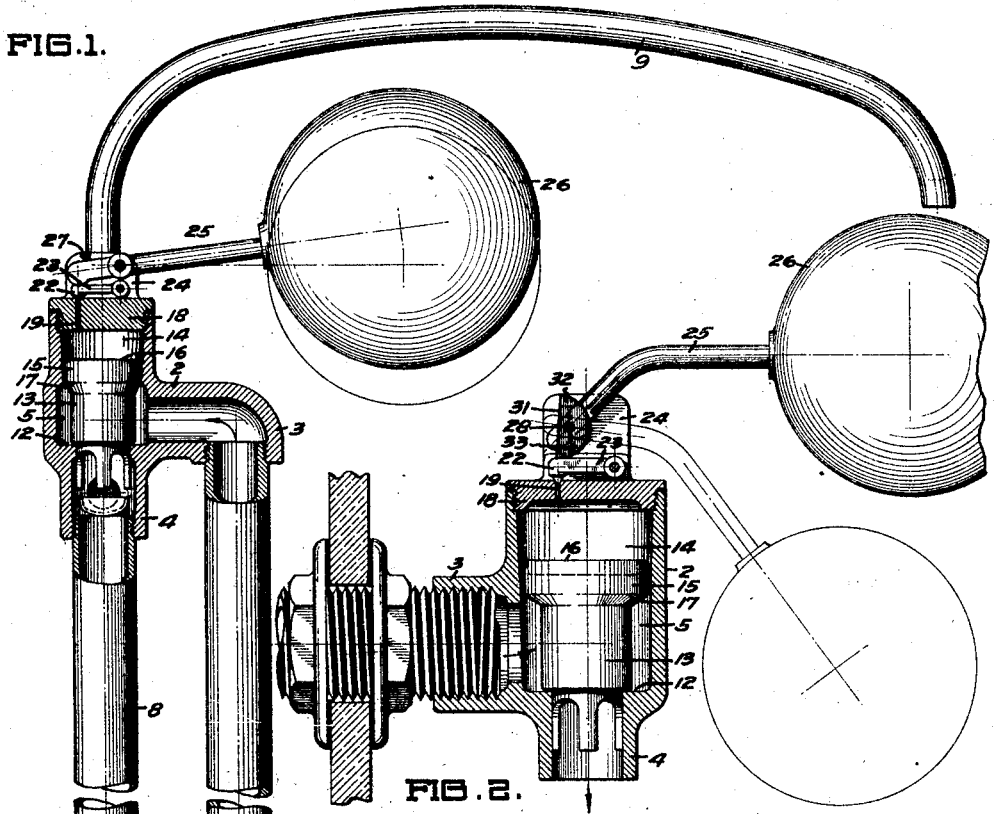
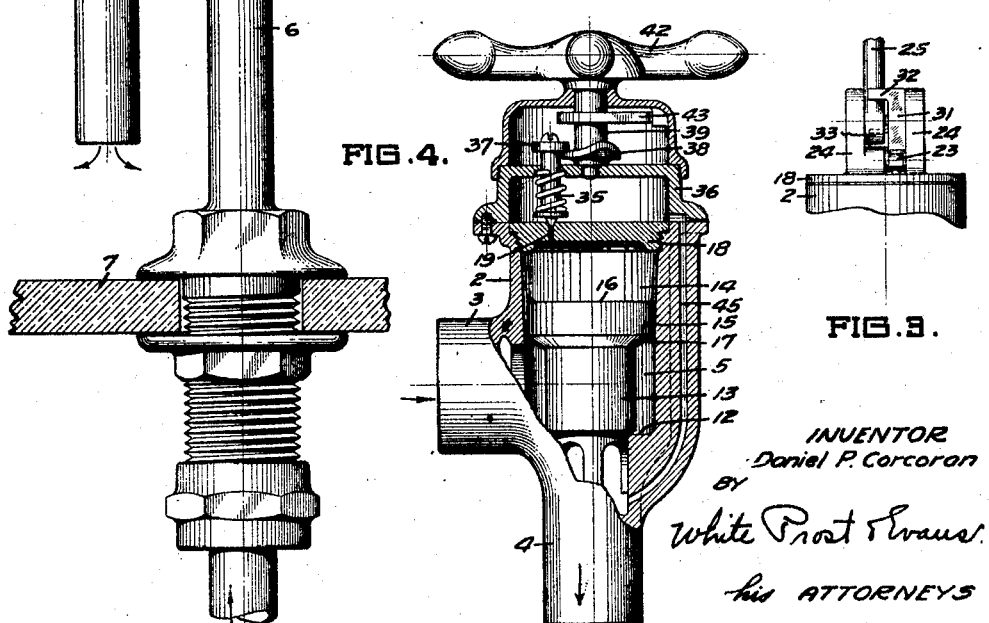
INVENTOR
Daniel P. Corcoran
BY
White Prost Evans
his ATTORNEYS Patented May 11, 1926.

1,583,960

UNITED STATES PATENT OFFICE.

DANIEL P. CORCORAN, OF GRIDLEY, CALIFORNIA.

VALVE.

Application filed August 14, 1924. Serial No. 731,922.

The invention relates to valves for controlling the flow of liquid and particularly to compensating valves in which the movement of the valve element is effected by the pressure of the liquid being controlled.

An object of the invention is to provide a valve operable under high or low pressure, which is opened and closed by the pressure of the liquid controlled by the valve.

Another object of the invention is to provide a float controlled valve in which the movement of the valve is controlled but not caused by the movement of the float.

Another object of the invention is to provide a valve adapted to be controlled by a float which is fully opened to permit the free flow of liquid when the float falls to a predetermined level and which is quickly closed when the float rises to a higher predetermined level.

Another object of the invention is to provide a valve through which liquid will flow for a predetermined time after actuation of the valve control means.

The invention possesses other advantageous features, some of which with the foregoing, will be set forth at length in the following description where I shall outline in full those forms of the invention which I have selected for illustration in the drawings accompanying and forming part of the present specification. In said drawings I have shown several types of valves embodying my invention, but it is to be understood that I do not limit myself to such forms, since the invention as set forth in the claims, may be embodied in a plurality of other forms.

Referring to said drawings:

Figure 1 is a side elevation, partly in section, of the valve of my invention arranged to control the flow of water into a flushing tank, such as is used in connection with toilets.

Figure 2 is a vertical section through a valve embodying my invention and adapted to control the flow of water into a container, such as a water trough for providing water for cattle and horses.

Figure 3 is an end elevation of the upper portion of the valve shown in Figure 2.

Figure 4 is a vertical section through a basin cock embodying the valve of my invention.

In accordance with my invention, I provide a valve which is operated by the pressure of the liquid, the flow of which is controlled by the valve. The valve is provided with a differential piston, which is exposed on opposite sides to the pressure of the liquid and the movement of the valve is controlled by controlling the pressure of the liquid on the side of the piston having the greater area. In accordance with the present embodiment of the invention, release of the pressure on the side of greatest area of the piston, causes the pressure applied to the other side of the piston to unseat the valve and an increase in pressure on the side of the piston of greater area serves to move the valve against its seat and to hold the valve seated by the differential pressure. The invention includes means for controlling the pressure of the liquid on the side of the piston having the greater area and this control means may be actuated in any desirable manner, such as by a float or by hand. The valve is particularly adapted to control the flow of water into a container, under conditions in which the flow of water is to be interrupted when the level of the water in the container reaches a predetermined height. The valve may also be employed to maintain the level of the water in a container between predetermined limits, the fall of the level to the lower limit serving to operate the control means to open the valve and the rise of the level to the upper limit serving to operate the control means to close the valve.

In Figure 1 I have shown the invention embodied in a valve which controls the flow of water into a flushing tank, such as a toilet tank. The valve comprises a valve body 2 having an inlet port 3 and an outlet port 4. The body is provided with a chamber 5 with which said ports are in communication and through which the liquid flows. In the construction shown in Figure 1, the water enters the inlet port 3 through the supply pipe 6 which extends through the bottom 7 of the tank and discharges into the tank through the discharge pipe 8. A bowl refilling pipe 9 is connected to the discharge port 4 of the valve and extends over and discharges into the hollow overflow pipe (not shown) of the tank, to furnish sufficient water to insure filling the bowl, after the bowl has been flushed.

The valve body is provided with a valve seat 12 with which is associated a valve 13. The chamber 5 in the valve body is provided with a slightly conical extension chamber 14 which is preferably in axial alinement with the valve seat and, secured to or formed on the upper end of the valve 13 is a piston or head 15 which is disposed in the chamber 14. The piston 15 is a differential piston having a circular top surface 16 of greater area than its annular bottom surface 17. The chamber 14 is closed at the top by a cap 18 having therein a vent 19 through which liquid may discharge from that portion of the chamber 14 which lies above the piston. Means are provided for controlling the discharge of water through the vent 19 to control the pressure of the water on the upper or larger surface of the piston 15. When the pressure of the water on the upper surface of the piston is equal to the pressure of the water on the lower annular surface of the piston, there is an excess of downward pressure on the piston, which moves the valve to its seat or holds the valve on its seat. When the pressure in the chamber above the piston is released, the pressure on the under annular surface is greater than the pressure on the top surface and the differential pressure moves the valve upward and away from its seat. The chamber 14 is preferably made of increasing diameter upwardly so that as the piston 15 moves upward in the chamber a greater clearance is provided between the chamber wall and the side face of the piston. When the piston is in its lower position, it fits rather snugly in the chamber but still provides for the passage of water past the piston into the chamber 14 above the piston. The description heretofore given of Figure 1 applies also to the structures shown in Figures 2 and 4, the differences in the structures shown in these figures being embodied in the means for controlling the discharge of water through the vent 19.

Referring now to Figure 2, in which the valve is shown on a somewhat larger scale, the valve is shown in the closed position and it is assumed that water under pressure is present in the inlet port 3 and in the chambers 5 and 14. The water leaks past the piston 15 and consequently the total pressure on the piston 15 produces a downward pressure on the valve, holding it to its seat. When the vent 19 is opened water discharges through the vent, reducing the pressure in the chamber 14, so that the piston and consequently the valve is moved upward by the pressure of the water against the underside of the piston. The piston thus moves upwardly in the chamber 14. When the vent 19 is closed, pressure accumulates in the chamber 14, due to the passage of water past the piston and as this pressure accumulates it forces the piston and the valve downwardly to seat the valve. By forming the chamber 14 of gradually increasing diameter upwardly, the water will flow more rapidly into the chamber 14 when the piston is raised, thereby providing for a more rapid initial downward movement of the valve, and the water will flow more slowly into the chamber as the piston lowers, thereby providing for a less rapid downward movement of the valve.

In the constructions shown in Figures 1 and 2, the flow of liquid through the vent 19 is controlled by a float which is disposed in the liquid in the tank or trough. In the construction shown in Figure 1, the discharge of liquid through the vent 19 is controlled by a valve 22 carried by the lever 23, which is pivoted on an ear 24 on the cap 18. Pivoted to the ear 24 above the lever 23 is a lever 25 which is provided at its outer end with a float 26. The inner end of the lever 25 lies above the lever 23 so that upward movement of the float causes downward movement of the lever 23, closing the vent 19. Downward movement of the float 26 releases the lever 23 and permits the water in the chamber 14 to escape through the vent 19. The downward movement of the float 26 is limited by a stop 27 formed on the ear 24.

In the construction shown in Figure 2, I have provided a lost motion device between the float lever 25 and the valve lever 23, so that the valve lever is not released until the float has fallen to a predetermined low level and so that the valve lever is not moved to close the vent 19 until the float has been raised to a predetermined high level. The lever 25 is fulcrumed on a pin 28 mounted on the ears 24 formed on the cap 18. Journalled on the pin 28 is a cam lever 31 which, in one position holds the lever 23 in position to close the vent 19 and, in the other position, is moved so that the lever 23 may be raised by the pressure of the water in the chamber 14, thus opening the vent 19. The cam lever 31 is provided above and below the lever 25 with pins or extensions 32 and 33 which are adapted to be engaged by the lever 25 as the float moves, to rock the cam lever on its fulcrum. In Figure 2 the lever 23 is shown in its depressed position, closing the vent 19, the float 26 being elevated. As the level of the water in the trough is lowered, the float 26 falls and, after it has moved downward a predetermined distance, the lever 25 comes into contact with the pin 33, so that further movement of the float downward causes the cam lever 31 to be rocked on its fulcrum to release the lever 23. The vent 19 is then opened and the valve 13 is raised, permitting water to flow into the trough and thus raise the float 26. The initial upward movement of the float has no effect upon the valve 13, so that the valve is fully opened. As the level of the water reaches its predetermined height, the lever 25 engages the pin 32 and the further upward movement of the float causes the cam lever 31 to be rocked to move the lever 23 downward to close the vent 19. Water under pressure then enters the chamber 14 and the valve is closed. It is apparent from this construction that the valve is held fully opened until the water reaches its predetermined high level, at which time the valve is quickly closed. This prevents any dripping of water from the valve and prevents the valve from reaching a critical position in which the valve is slightly cracked and water is very slowly flowing through the valve. This construction has the further advantage of preventing the flow of water through the valve and the consequent hissing of the valve due to slight variations in the level of the water in the trough, such as ripples.

In Figure 4 I have shown the valve of my invention embodied in a basin cock, the function of which is to remain open for a short time after the handle has been released, so that water will discharge from the valve. The passage of water through the vent 19 is controlled by the spring pressed valve pin 35, which is mounted in the extension piece 36 secured to the valve body. The pin 35 is provided on its upper end with a head 37, under which engages a cam 38 on the stem 39 of the handle 42. The handle is movable through an arc to bring the high point of the cam 38 under the head 37 to raise the valve pin 35 and is returned to neutral position by the spring 43. It is apparent that when the handle 42 is released and the vent 19 closed, that the valve 15 will start downwardly and that water will flow through the valve body until the valve reaches its seat. By making the tapering clearance between the chamber 14 and the piston 15 very small, the downward movement of the valve 13 will be slow. In this construction the valve body is provided with a drain conduit 45 so that the water which discharges through the vent 19 is conveyed to the discharge port 4 of the cock.

I claim:

1. A valve comprising a valve body enclosing a valve chamber provided with inlet and outlet ports, a valve seat in said body between said ports, a valve plug associated with said seat and disposed within said chamber, said chamber having a generally conical portion above said plug, a piston on the plug disposed in said generally conical chamber, the inlet port opening into the chamber below the piston, the pressure of the liquid entering the inlet port serving to force liquid past the piston into the chamber above the piston, depressing the piston and moving the valve against its seat, the chamber above the piston being provided with a vent and a float for controlling the opening and closing of the vent to control the pressure in the cylinder above the piston.

2. A valve comprising a valve body enclosing a valve chamber provided with inlet and outlet ports, a valve seat in said body between said ports, a valve plug associated with said seat and disposed within said chamber, said chamber having a generally conical portion above said plug, a piston on the plug disposed in said generally conical chamber, the inlet port opening into the chamber below the piston, the pressure of the liquid entering the inlet port serving to force liquid past the piston into the chamber above the piston, depressing the piston and moving the valve against its seat, the chamber above the piston being provided with a vent, a valve controlling the opening and closing of said vent and a float controlling the position of said latter valve.

3. A valve comprising a valve body enclosing a valve chamber provided with inlet and outlet ports, a valve seat in said body between said ports, a valve plug associated with said seat and disposed within said chamber, said chamber having a generally conical portion above said plug, a piston on the plug disposed in said generally conical chamber, the inlet port opening into the chamber below the piston, the pressure of the liquid entering the inlet port serving to force liquid past the piston into the chamber above the piston, depressing the piston and moving the valve against its seat, the chamber above the piston being provided with a vent, a valve controlling the opening and closing of said vent, a float and a lost motion device interposed between the latter valve and the float, and operated by the float for controlling the position of the valve.

4. A valve comprising a valve body enclosing a valve chamber provided with inlet and outlet ports, a valve seat in said body between said ports, a valve plug associated with said seat and disposed within said chamber, said chamber having a generally conical portion above said plug, a piston on the plug disposed in said generally conical chamber, the inlet port opening into the chamber below the piston, the pressure of the liquid entering the inlet port serving to force liquid past the piston into the chamber above the piston, depressing the piston and moving the valve against its seat, the chamber above the piston being provided with a vent, a valve controlling the opening and closing of the vent, means operated by a rise in the level of the liquid in the container into which the valve discharges, to a predetermined level to close the vent and by a fall in the level of the liquid to a lower predetermined level to open the vent.

5. A valve comprising a valve body enclosing a valve chamber provided with inlet and outlet ports, a valve seat in said body between said ports, a valve plug associated with said seat and disposed within said chamber, said chamber having a generally conical portion above said plug, a piston on the plug disposed in said generally conical chamber, the inlet port opening into the chamber below the piston, the pressure of the liquid entering the inlet port serving to force liquid past the piston into the chamber above the piston, depressing the piston and moving the valve against its seat, the chamber above the piston being provided with a vent, a valve controlling the opening and closing of said vent, a rod pivoted adjacent said valve, a float on said rod and a lost motion device between the rod and the latter valve.

6. A valve comprising a valve body enclosing a chamber having inlet and outlet ports, a valve adapted to close the outlet port, a piston on said valve having a top surface of greater area than its bottom surface, a chamber of increasing diameter upwardly in which said piston is disposed, whereby the rate of leakage past the piston varies in accordance with the position of the piston in the chamber and means for controlling the discharge of liquid from the chamber above the piston.

7. A valve comprising a valve body enclosing a chamber having inlet and outlet ports, said chamber having an upwardly flaring cylindrical extension in axial alinement with the outlet port, a valve adapted to close the outlet port, a piston secured to and disposed above said valve and disposed in said cylindrical chamber, said cylindrical chamber being provided above the piston with a vent and means for controlling the discharge of liquid through said vent.

8. A valve comprising a valve body enclosing a chamber having inlet and outlet ports, said chamber having an upwardly flaring cylindrical extension in axial alinement with the outlet port, a valve adapted to close the outlet port, a piston secured to and disposed above said valve and disposed in said cylindrical chamber, said cylindrical chamber being provided above the piston with a vent and a float for controlling the discharge of liqud through said vent.

9. A valve comprising a valve body enclosing a chamber having inlet and outlet ports, a cylinder in alinement with the outlet port and forming an extension of said chamber, the diameter of the cylinder increasing upwardly from said chamber, a valve associated with the outlet port, a differential piston secured to and disposed above the valve in said cylinder, leakage of liquid past the piston into said cylinder serving to produce a pressure to hold the valve to its seat, said cylinder being provided above the piston with a vent and means for controlling the discharge of liquid through said vent.

10. A valve comprising a valve body enclosing a chamber having inlet and outlet ports, a valve adapted to close the outlet port, a piston on said valve having a top surface of greater area than its bottom surface, a chamber of increasing diameter upwardly in which said piston is disposed, whereby the rate of leakage past the piston varies in accordance with the position of the piston in the chamber, and means for controlling the discharge of liquid from the chamber above the piston.

In testimony whereof I have hereunto set my hand.

DANIEL P. CORCORAN.